United States Patent
Yamada et al.

(10) Patent No.: US 11,292,881 B2
(45) Date of Patent: Apr. 5, 2022

(54) POLYOXYALKYLENE GROUP-CONTAINING ORGANOSILICON COMPOUND AND METHOD FOR PRODUCING SAME

(71) Applicant: SHIN-ETSU CHEMICAL CO., LTD., Tokyo (JP)

(72) Inventors: Tetsuro Yamada, Annaka (JP); Munenao Hirokami, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 129 days.

(21) Appl. No.: 16/487,274

(22) PCT Filed: May 16, 2017

(86) PCT No.: PCT/JP2017/018324
§ 371 (c)(1),
(2) Date: Aug. 20, 2019

(87) PCT Pub. No.: WO2018/163445
PCT Pub. Date: Sep. 13, 2018

(65) Prior Publication Data
US 2021/0163690 A1 Jun. 3, 2021

(30) Foreign Application Priority Data
Mar. 9, 2017 (JP) .............................. JP2017-044909

(51) Int. Cl.
| C09J 171/02 | (2006.01) |
| C08G 65/334 | (2006.01) |
| C08G 65/336 | (2006.01) |
| C08G 77/28 | (2006.01) |
| C09D 183/08 | (2006.01) |
| C09J 183/08 | (2006.01) |
| C09D 171/02 | (2006.01) |

(52) U.S. Cl.
CPC ........... C08G 77/28 (2013.01); C08G 65/334 (2013.01); C08G 65/336 (2013.01); C09D 171/02 (2013.01); C09D 183/08 (2013.01); C09J 171/02 (2013.01); C09J 183/08 (2013.01)

(58) Field of Classification Search
CPC .......................... C08G 65/3342; C08G 65/336
See application file for complete search history.

(56) References Cited

U.S. PATENT DOCUMENTS

| 4,005,030 | A | 1/1977 | Heckert et al. | |
| 7,153,923 | B2* | 12/2006 | Schindler | C08G 18/10 |
| | | | | 528/35 |
| 2004/0072921 | A1 | 4/2004 | Stanjek et al. | |
| 2006/0128919 | A1* | 6/2006 | Okamoto | C08G 65/336 |
| | | | | 528/25 |
| 2007/0265409 | A1 | 11/2007 | Wakabayashi et al. | |
| 2012/0210894 | A1 | 8/2012 | Nagase | |
| 2014/0288222 | A1* | 9/2014 | Yano | C08G 65/336 |
| | | | | 524/296 |
| 2015/0125684 | A1* | 5/2015 | Ando | C08G 65/336 |
| | | | | 428/220 |
| 2016/0376420 | A1* | 12/2016 | Yano | C08K 5/092 |
| | | | | 524/297 |

FOREIGN PATENT DOCUMENTS

| JP | 8-184960 A | 7/1996 |
| JP | 2004-99908 A | 4/2004 |
| JP | 2004-518801 A | 6/2004 |
| JP | 2010-209205 A | 9/2010 |
| JP | 2012-171247 A | 9/2012 |
| JP | 2015-38192 A | 2/2015 |
| JP | 2015-38196 A | 2/2015 |
| JP | 2016-121075 A | 7/2016 |
| WO | WO 2006/051799 A1 | 5/2006 |

OTHER PUBLICATIONS

International Search Report (PCT/ISA/210) issued in PCT/JP2017/018324, dated Jul. 4, 2017.

* cited by examiner

*Primary Examiner* — Marc S Zimmer
(74) *Attorney, Agent, or Firm* — Birch, Stewart, Kolasch & Birch, LLP

(57) ABSTRACT

Provided is a polyoxyalkylene group-containing organosilicon compound which contains at least one group represented by structural formula (1) in one molecule and has a polyoxyalkylene structure in the main chain. This polyoxyalkylene group-containing organosilicon compound exhibits satisfactorily fast curability and excellent safety even when an amine compound is used as a curing catalyst

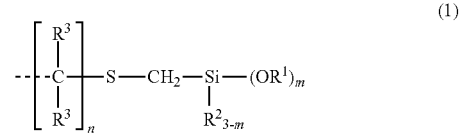

(1)

(In the formula, each $R^1$ independently represents an unsubstituted or substituted C1-10 alkyl group, or an unsubstituted or substituted C6-10 and group, each $R^2$ independently represents an unsubstituted or substituted C1-10 alkyl group, or an unsubstituted or substituted C6-10 aryl group, and each $R^3$ independently represents an unsubstituted or substituted C1-10 alkyl group, or a hydrogen atom. m is a number from 1-3, and n is an integer of 2 or greater. A dashed line represents a bond.)

16 Claims, No Drawings

POLYOXYALKYLENE GROUP-CONTAINING ORGANOSILICON COMPOUND AND METHOD FOR PRODUCING SAME

TECHNICAL FIELD

This invention relates to a polyoxyalkylene-containing organosilicon compound and a method for preparing the same. More particularly, it relates to a polyoxyalkylene-containing organosilicon compound having a silicon group capable of forming a siloxane bond for crosslinking (also referred to as "reactive silicon group," hereinafter) at the end of the molecular chain and a backbone composed of a polyoxyalkylene group, and a method for preparing the same.

BACKGROUND ART

Since reactive silicon groups, especially alkoxysilyl groups are susceptible to hydrolytic condensation in the presence of water, polymers having reactive silicon groups may be used as curable compositions adapted to crosslink and cure in the presence of water or moisture.

Of these polymers, the polymers having a backbone composed of a polyoxyalkylene group are generally known as modified silicones. Also, since curable compositions using such polymers are liquid at room temperature and cure into rubber elastomers, they are widely utilized as coating agents, adhesives, and building sealants while taking advantage of such characteristics.

A number of proposals have been made for preparing polymers having a reactive silicon group at the end of the molecular chain and some of them have been already manufactured industrially.

For example, of compounds having a backbone composed of a polyoxyalkylene group and containing alkoxysilyl at the end of the molecular chain, a polymer having a backbone composed of a polyoxypropylene group and containing methyldimethoxysilyl at both ends of the molecular chain is known. Room temperature curable compositions based on an alkoxysilyl-endcapped polyoxyalkylene compound as a typical example of such polymers are known from Patent Documents 1 and 2.

The room temperature curable compositions disclosed in Patent Documents 1 and 2, however, exhibit poor reactivity with airborne moisture and have insufficient curability. Then the addition of catalysts such as organotin compounds is indispensable to ensure sufficient cure at room temperature. Because of the concern that the organotin compounds are toxic to the human body and environment, the use of these compounds is avoided in harmonization with the recent strict environmental regulations.

For the purpose of improving reactivity, Patent Document 3 discloses an alkoxysilyl-endcapped polymer obtained by reacting a hydroxyl-terminated polymer with an isocyanatosilane.

Although the compound of Patent Document 3 is fully reactive, substantial coloring occurs with the lapse of time because the compound contains a urethane or urea bond in the molecule. Thus yellowing resistance is insufficient. It is also considered problems that a low-boiling isocyanatosilane having extreme toxicity is used in the preparation of the endcapped polymer, and a similar low-boiling isocyanatosilane is formed as a result of pyrolysis of a urethane or urea bond at high temperature.

PRIOR ART DOCUMENTS

Patent Documents

Patent Document 1: JP-A 2004-099908
Patent Document 2: JP-A 2010-209205
Patent Document 3: JP-A 2004-518801

SUMMARY OF INVENTION

Technical Problem

An object of the invention, which has been made under the above-mentioned circumstances, is to provide a polyoxyalkylene-containing organosilicon compound which remains fast curable even when an amine compound is used as the curing catalyst, and has good safety, and a method for preparing the same.

Solution to Problem

Making extensive investigations to attain the above object, the inventors have found that a specific polyoxyalkylene-containing organosilicon compound having a sulfide-methylene bond as the linking group between an alkoxysilyl group and a backbone composed of polyoxyalkylene remains fast curable even when an amine compound is used instead of an organotin compound as the curing catalyst, and forms a cured product having yellowing resistance and low toxicity because of the elimination of isocyanatosilanes, and that a composition comprising the compound is suited as a curable composition for forming various materials such as coating agents, adhesives, and sealants. The invention is predicated on this finding.

The invention provides the following.

1. A polyoxyalkylene-containing organosilicon compound having a polyoxyalkylene structure in the backbone and containing per molecule at least one group having the structural formula (1):

[Chem. 1]

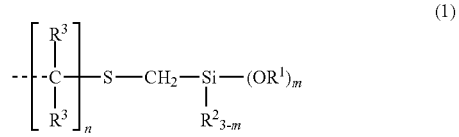

wherein $R^1$ is each independently a substituted or unsubstituted $C_1$-$C_{10}$ alkyl group or a substituted or unsubstituted $C_6$-$C_{10}$ aryl group, $R^2$ is each independently a substituted or unsubstituted $C_1$-$C_{10}$ alkyl group or a substituted or unsubstituted $C_6$-$C_{10}$ aryl group, $R^3$ is each independently hydrogen or a substituted or unsubstituted $C_1$-$C_{10}$ alkyl group, m is a number of 1 to 3, n is an integer of at least 2, and the broken line represents a valence bond.

2. The polyoxyalkylene-containing organosilicon compound of 1, having the structural formula (2):

[Chem. 2]

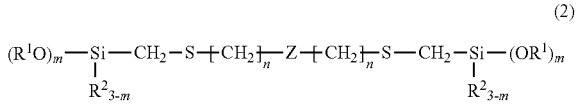

wherein $R^1$, $R^2$, m and n are as defined above, and 3 is a polyoxyalkylene structure having the formula (3):

[Chem. 3]

(3)

wherein $R^4$ is a $C_1$-$C_{14}$ divalent hydrocarbon group, p is a number of at least 1, and the broken line represents a valence bond.

The polyoxyalkylene-containing organosilicon compound of 1 or 2 which has a number average molecular weight of 200 to 50,000.

4. A method for preparing the polyoxyalkylene-containing organosilicon compound of any one of 1 to 3, comprising the step of reacting a polyoxyalkylene compound capped with alkenyl at the end of the molecular chain with a compound having mercapto and alkoxysilyl groups represented by the formula (4):

[Chem. 4]

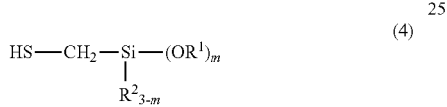

(4)

wherein $R^1$, $R^2$, and m are as defined above.

5. The method of 4 wherein the polyoxyalkylene compound has the formula (5):

[Chem. 5]

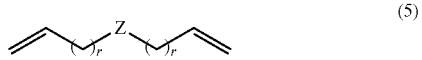

(5)

wherein Z is as defined above and r is an integer of at least 0.

6. A curable composition comprising (A) the polyoxyalkylene-containing organosilicon compound of any one of 1 to 3 and (B) a curing catalyst.
7. The curable composition of 6 wherein the curing catalyst (B) is an amine compound.
8. A cured product obtained from curing of the curable composition of 6 or 7.
9. A coating composition comprising (A) the polyoxyalkylene-containing organosilicon compound of any one of 1 to 3 and (B) a curing catalyst.
10. The coating composition of 9 wherein the curing catalyst (B) is an amine compound.
11. An article having a coating layer obtained from curing of the coating composition of 9 or 10.
12. An adhesive composition comprising (A) the polyoxyalkylene-containing organosilicon compound of any one of 1 to 3 and (B) a curing catalyst.
13. The adhesive composition of 12 wherein the curing catalyst (B) is an amine compound.
14. An article having a bond layer obtained from curing of the adhesive composition of 12 or 13.

Advantageous Effects of Invention

The polyoxyalkylene-containing organosilicon compound of the invention remains fast curable even without using organotin compounds as the curing catalyst, and is excellent in yellowing resistance because of the absence of a urethane or urea bond. The compound is least toxic and fully safe because of the elimination of isocyanatosilanes.

The compound having such properties may be advantageously used as the main component (i.e., base polymer) of coating agents, adhesives, and sealants.

DESCRIPTION OF EMBODIMENTS

Now the invention is described in detail.

The invention provides a polyoxyalkylene-containing organosilicon compound having a polyoxyalkylene structure in the backbone and containing at least one group having the structural formula (1) per molecule.

[Chem. 6]

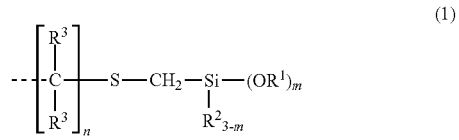

(1)

In formula (1), $R^1$ is each independently a substituted or unsubstituted $C_1$-$C_{10}$, preferably $C_1$-$C_4$ alkyl group or a substituted or unsubstituted $C_6$-$C_{10}$ aryl group, $R^2$ is each independently a substituted or unsubstituted $C_1$-$C_{10}$, preferably $C_1$-$C_4$ alkyl group or a substituted or unsubstituted $C_1$-$C_{10}$ aryl group, $R^3$ is each independently hydrogen or a substituted or unsubstituted $C_1$-$C_{10}$, preferably $C_1$-$C_3$ alkyl group, m is a number of 1 to 3, n is an integer of at least 2, and the broken line represents a valence bond.

The $C_1$-$C_{10}$ alkyl group may be straight, branched or cyclic and examples thereof include straight or branched alkyl groups such as methyl, ethyl, n-propyl, isopropyl, n-butyl, s-butyl, t-butyl, n-pentyl, neopentyl, n-hexyl, n-heptyl, n-octyl, n-nonyl, and n-decyl and cycloalkyl groups such as cyclopropyl, cyclobutyl, cyclopentyl, cyclohexyl, cycloheptyl, and cyclooctyl.

Examples of the $C_6$-$C_{10}$ aryl group include phenyl, tolyl, xylyl, α-naphthyl, and β-naphthyl.

Also, some or all of the hydrogen atoms on these groups may be substituted by halogen atoms such as F, Cl and Br, cyano or the like. Exemplary are 3-chloropropyl, 3,3,3-trifluoropropyl, and 2-cyanoethyl.

Of these, $R^1$ and $R^2$ are preferably selected from methyl, ethyl, and phenyl, and methyl is more preferred in view of curability, availability, productivity and cost.

$R^3$ is preferably selected from hydrogen, methyl, and phenyl, and hydrogen is more preferred in view of curability, availability, productivity and cost.

The subscript m is a number of 1 to 3. In view of reactivity, m is preferably 2 to 3, most preferably 3.

The subscript n is an integer of at least 2. In view of reactivity, n is preferably 2 to 15, more preferably 2 to 3, most preferably 2.

The polyoxyalkylene-containing organosilicon compound of the invention is not particularly limited as long as it has a backbone skeleton composed of a polyoxyalkylene group and contains at least one terminal structure having formula (1) per molecule. While the backbone skeleton may have a linear, branched or crosslinked structure, the linear structure is preferred from the standpoints of mechanical properties of the cured product and storage stability of the composition.

A "linear" polyoxyalkylene-containing organosilicon compound means that the linking mode between divalent oxyalkylene groups as repeating units to construct the polyoxyalkylene structure is linear. Each oxyalkylene group may be linear or branched, for example, oxypropylene group (—OCH(CH$_3$)CH$_2$—).

In conjunction with the inventive polyoxyalkylene-containing organosilicon compound, if the number per molecule of reactive silicon-containing groups having the structural formula (1) is less than 1 on the average, a composition based on such a compound becomes less curable or its cured product has insufficient mechanical properties. On the contrary, if the number of reactive silicon-containing groups is too much, the crosslinking density becomes so high that the cured product may not exhibit desired mechanical properties, or the storage stability of the composition may be exacerbated. For this reason, the number of reactive silicon-containing groups per molecule is at least 1, preferably 1.1 to 5, more preferably 2 to 4, most preferably 2 (for example, one at each end of a molecular chain which is linear).

Therefore, the polyoxyalkylene-containing organosilicon compound of the invention should preferably have the structural formula (2). The use of the relevant compound leads to further improvements in mechanical properties of a cured product and storage stability of a composition.

[Chem. 7]

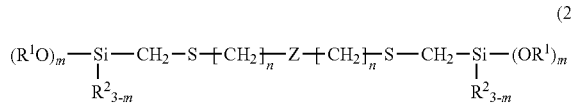

(2)

Herein R$^1$, R$^2$, m and n are as defined above.

In formula (2), Z is a polyoxyalkylene structure represented by the formula (3). The use of the relevant compound leads to further improvements in mechanical properties of a cured product and storage stability of a composition.

[Chem. 8]

(3)

In formula (3), R$^4$ is a divalent hydrocarbon group, p is a number of at least 1, and the broken line represents a valence bond. Notably, when a plurality of R$^4$ are included (i.e., p is at least 2), R$^4$ may be the same or different.

The divalent hydrocarbon group is preferably a divalent aliphatic hydrocarbon group, more preferably straight or branched C$_1$-C$_{14}$ alkylene group, and even more preferably straight or branched C$_2$-C$_4$ alkylene group, though not limited thereto.

Examples of the straight or branched C$_1$-C$_{14}$ alkylene group include methylene, ethylene, propylene, trimethylene, tetramethylene, isobutylene, pentamethylene, hexamethylene, heptamethylene, and octamethylene.

Of these, R$^4$ is preferably selected from methylene, ethylene, propylene, tetramethylene, and isobutylene.

Examples of the repeating unit (—OR$^4$—) in formula (3) include oxyalkylene groups such as —OCH$_2$—, —OCH$_2$CH$_2$—, —OCH$_2$CH$_2$CH$_2$—, —OCH(CH$_3$)CH$_2$—, —OCH(CH$_2$CH$_3$)CH$_2$—, —OC(CH$_3$)$_2$CH$_2$—, and —OCH$_2$CH$_2$CH$_2$CH$_2$—.

The subscript p is a number of at least 1. In view of mechanical properties of a cured product and workability of a composition, p is preferably a number of 5 to 700, more preferably 10 to 500, and even more preferably 20 to 300.

As mentioned above, the backbone skeleton of the oxyalkylene-containing organosilicon compound may be composed of repeating units of one type having formula (3) or repeating units of two or more types having formula (3). A compound composed mainly of oxypropylene (—OCH(CH$_3$)CH$_2$—) is preferred from the aspect of durability, when used as a material such as a coating agent, adhesive or sealant.

The number average molecular weight (Mn) of the oxyalkylene-containing organosilicon compound is not particularly limited. From the aspects of adjusting the viscosity of a curable composition containing the relevant compound to an appropriate range for efficient working and of imparting sufficient curability, the Mn is preferably 200 to 50,000, more preferably 1,000 to 20,000. As used herein, the Mn is measured by gel permeation chromatography (GPC) versus polystyrene standards (the same holds true, hereinafter).

The viscosity of the polyoxyalkylene-containing organosilicon compound is not particularly limited. From the aspects of adjusting the viscosity of a curable composition containing the relevant compound to an appropriate range for efficient working and of imparting sufficient curability, the viscosity is preferably 10 to 100,000 mPa·s, more preferably 50 to 50,000 mPa·s, and even more preferably 100 to 10,000 mPa·s. As used herein, the viscosity is measured at 25° C. by a Brookfield rotational viscometer.

The polyoxyalkylene-containing organosilicon compound defined above may be obtained by reacting a polyoxyalkylene compound capped with alkenyl at the end of the molecular chain with a compound having mercapto and alkoxysilyl groups represented by the formula (4), the latter compound being referred to as mercaptosilane, hereinafter.

More specifically, a thiol-ene reaction is conducted between the alkenyl group on the polyoxyalkylene compound capped with alkenyl at the end of the molecular chain and the mercapto group on the mercaptosilane.

[Chem. 9]

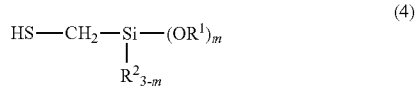

(4)

Herein, R$^1$, R$^2$, and m are as defined above.

Examples of the mercaptosilane having formula (4) include mercaptomethyltrimethoxysilane; mercaptomethyldimethoxymethylsilane, mercaptomethylmethoxydimethylsilane, mercaptomethyltriethoxysilane, mercaptomethyldiethoxymethylsilane, and mercaptomethylethoxydimethylsilane.

Of these, mercaptomethyltrimethoxysilane, mercaptomethyldimethoxymethylsilane, and mercaptomethyltriethoxysilane are preferred in view of hydrolysis, with mercaptomethyltrimethoxysilane being more preferred.

The polyoxyalkylene compound capped with alkenyl at the molecular chain end is not particularly limited as long as it is a compound having a polyoxyalkylene group as the backbone skeleton. Although the backbone skeleton may have a linear, branched or crosslinked structure, a linear structure is preferred in view of mechanical properties of a cured product and storage stability of a composition as mentioned above.

Therefore, the polyoxyalkylene compound capped with alkenyl at the molecular chain end is preferably a compound having the structural formula (5). The use of the relevant compound leads to further improvements in mechanical properties of a cured product and storage stability of a composition.

[Chem. 10]

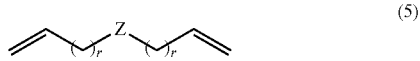
(5)

Herein Z is as defined above and r is an integer of at least 0.

In formula (5), r is an integer of at least 0. In view of reactivity, r is preferably an integer of 0 to 10, more preferably 0 to 3, most preferably 1.

Illustrative examples of the polyoxyalkylene compound capped with alkenyl at the molecular chain end represented by the formula (5) include compounds having the following structural formulae, but are not limited thereto. Any polyoxyalkylene compounds capped with alkenyl at the molecular chain end may be used.

[Chem. 11]

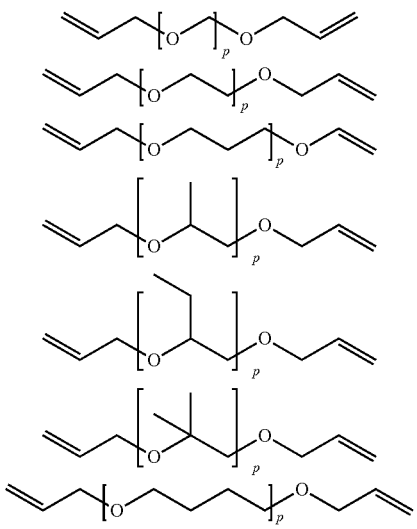

Herein p is as defined above.

The number average molecular weight (Mn) of the polyoxyalkylene compound having formula (5) is not particularly limited. From the aspects of adjusting the viscosity of a curable composition containing the relevant compound to an appropriate range for efficient working and of imparting sufficient curability, the Mn is preferably 200 to 50,000, more preferably 1,000 to 20,000.

From the aspects of suppressing formation of by-products during thiol-ene reaction and enhancing storage stability and properties of the resulting polyoxyalkylene compound, the polyoxyalkylene compound of formula (5) and the mercaptosilane of formula (4) are preferably used for reaction in such a proportion as to give 0.8 to 1.5 moles, more preferably 0.9 to 1.2 moles of mercapto groups on the mercaptosilane of formula (4) per mole of alkenyl groups on the polyoxyalkylene compound of formula (5).

During the thiol-ene reaction, a catalyst may be used for enhancing the reaction rate although the catalyst need not be used.

The catalyst may be selected from those commonly used in thiol-ene reaction, but not limited thereto. Preference is given to radical polymerization initiators capable of generating radicals by heat, light or redox reaction.

Suitable catalysts include organic peroxides such as aqueous hydrogen peroxide, tert-butyl hydroperoxide, di-tert-butyl peroxide, (2-ethylhexanoyl)(tert-butyl) peroxide, benzoyl peroxide, cumene hydroperoxide, and dicumyl peroxide; azo compounds such as 2,2'-azobispropane, 2,2'-azobisisobutane, 2,2'-azobisisobutyronitrile, 2,2'-azobis-2-methylbutyronitrile, 2,2'-azobis-2-methylvaleronitrile, 2,2'-azobis-2,4-dimethylvaleronitrile, methyl 2,2'-azobis-2-methylpropionate, 2,2'-dichloro-2,2'-azobispropane, 2,2'-dichloro-2,2'-azobisbutane, 1,1'-azo(methylethyl)diacetate, 2,2'-azobisisobutylamide, dimethyl 2,2'-azobisisobutyrate, 3,5-dihydroxymethylphenylazo-2-methylmalonodinitrile, and dimethyl 4,4'-azobis-4-cyanovalerate; redox initiators such as hydrogen peroxide-iron(II) salt, cerium(IV) salt-alcohol, and organic peroxide-dimethylaniline; photopolymerization initiators such as 2-benzyl-2-dimethylamino-1-(4-morpholinophenyl)-1-butanone, 2-methyl-1-[4-(methylthio)phenyl]-2-morpholinopropan-1-one, 2-dimethylamino-2-(4-methylbenzyl)-1-(4-morpholin-4-ylphenyl)butan-1-one, 1-hydroxycyclohexyl phenyl ketone, 2-hydroxy-2-methyl-1-phenylpropan-1-one, 2,2-dimethoxy-1,2-diphenylethan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methylpropan-1-one, 2,4,6-trimethylbenzoyl-diphenylphosphine oxide, bis(2,4,6-trimethylbenzoyl) phenylphosphine oxide, and bis(2,6-dimethoxybenzoyl)-2,4,4-trimethylpentylphosphine oxide; and dialkyl disulfides such as tetraalkylthiuram disulfides. These compounds may be used alone or in admixture.

Of these, (2-ethylhexanoyl)(tert-butyl) peroxide and 2,2'-azobis-2-methylbutyronitrile are preferred from the standpoint of reaction rate during thiol-ene reaction, with 2,2'-azobis-2-methylbutyronitrile being more preferred.

The amount of the catalyst used may be a catalytic amount. Typically, the amount is 0.001 to 10% by weight based on the total of the polyoxyalkylene compound capped with alkenyl at the end of the molecular chain and the mercaptosilane of formula (4).

Although the thiol-ene reaction takes place in a solventless system, a solvent which is not detrimental to the reaction may be used.

Suitable solvents include hydrocarbon solvents such as pentane, hexane, heptane, octane, decane and cyclohexane, aromatic solvents such as benzene, toluene, and xylene, amide solvents such as formamide, N,N-dimethylformamide, pyrrolidone, and N-methylpyrrolidone, and ester solvents such as ethyl acetate, butyl acetate, γ-butyrolactone, and propylene glycol-1-monomethylether-2-acetate. They may be used alone or in admixture.

Although the temperature of thiol-ene reaction is not particularly limited, a temperature of 25 to 150° C., especially 40 to 100° C. is preferred for adjusting the reaction rate appropriate and controlling side reactions.

The reaction time is typically 10 minutes to 24 hours though not particularly limited.

The curable composition, coating composition, or adhesive composition (sometimes commonly referred to as composition, hereinafter) of the invention contains (A) the polyoxyalkylene-containing organosilicon compound having formula (1) and (B) a curing catalyst.

The curable composition containing (A) the polyoxyalkylene-containing organosilicon compound having formula (1) is improved in cure during coating treatment or bonding treatment over the prior art compositions and offers a cured product which is least toxic due to the elimination of isocyanatosilanes.

The curing catalyst (B) is a component for promoting hydrolytic condensation of hydrolyzable groups on the polyoxyalkylene-containing organosilicon compound (A) with airborne moisture and helping the composition cure, and added for efficient curing.

The curing catalyst is not particularly limited as long as it is used in conventional moisture condensation cure compositions. Examples include alkyl tin compounds such as dibutyltin oxide and dioctyltin oxide; alkyl tin ester compounds such as dibutyltin diacetate, dibutyltin dilaurate, dioctyltin dilaurate, dibutyltin dioctoate, dioctyltin dioctoate, and dioctyltin diversatate; titanates, titanium chelate compounds and partial hydrolyzates thereof such as tetraisopropoxytitanium, tetra-n-butoxytitanium, tetrakis(2-ethylhexoxy)titanium, dipropoxybis(acetylacetonato)titanium, titanium diisopropoxybis(ethylacetoacetate), and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, aluminum trihydroxide, aluminum alcoholate, aluminum acylate, aluminum acylate salts, aluminosiloxy compounds, and aluminum chelates; aminoalkyl-substituted alkoxysilanes such as 3-aminopropyltrimethoxysilane, 3-aminopropyltriethoxysilane, 3-aminopropylmethyldimethoxysilane, 3-aminopropylmethyldiethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine, and N-phenyl-3-aminopropyltrimethoxysilane; amine compounds and salts thereof such as hexylamine and dodecylamine phosphate; quaternary ammonium salts such as benzyltriethylammonium acetate; alkali metal salts of lower fatty acids such as potassium acetate, sodium acetate, and lithium oxalate; dialkylhydroxylamines such as dimethylhydroxylamine and diethylhydroxylamine; silanes and siloxanes having a guanidyl group such as tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, and tetramethylguanidylpropyltris(trimethylsiloxy)silane; and phosphazene base-containing silanes and siloxanes such as N,N,N',N',N'',N''-hexamethyl-N'''-[3-(trimethoxysilyl)propyl]-phosphorimidic triamide, which may be used alone or in admixture.

Of these, preference is given to dioctyltin dilaurate, dioctyltin diversatate, tetraisopropoxytitanium, tetra-n-butoxytitanium, titanium diisopropoxybis(ethylacetoacetate), 3-aminopropyltrimethoxysilane, N-β-(aminoethyl)-γ-aminopropyltrimethoxysilane, bis[3-(trimethoxysilyl)propyl]amine, N,N'-bis[3-(trimethoxysilyl)propyl]ethane-1,2-diamine, and tetramethylguanidylpropyltrimethoxysilane because of more reactivity. From the standpoint of effective cure of the composition, more preference is given to dioctyltin dilaurate, dioctyltin diversatate, 3-aminopropyltrimethoxysilane, and tetramethylguanidylpropyltrimethoxysilane. From the standpoint that the composition is free of organotin compounds and less toxic, 3-aminopropyltrimethoxysilane and tetramethylguanidylpropyltrimethoxysilane are especially preferred. From the standpoint of effective cure of the composition, tetramethylguanidylpropyltrimethoxysilane is most preferred.

Although the amount of the curing catalyst added is not particularly limited, the amount is preferably 0.01 to 15 parts by weight, more preferably 0.1 to 5 parts by weight per 100 parts by weight of the polyoxyalkylene-containing organosilicon compound having formula (1) because it is desirable to adjust the curing rate to an appropriate range for efficient working.

The inventive composition may further comprise a solvent. The solvent used herein is not particularly limited as long as the polyoxyalkylene-containing organosilicon compound having formula (1) as the main component is dissolvable therein. Examples of the solvent include hydrocarbon solvents such as pentane, hexane, heptane, octane, decane, and cyclohexane; aromatic solvents such as benzene, toluene, and xylene; amide solvents such as formamide, N,N-dimethylformamide, pyrrolidone, and N-methylpyrrolidone; ester solvents such as ethyl acetate, butyl acetate, γ-butyrolactone, and propylene glycol-1-monomethyl ether-2-acetate; ketone solvents such as acetone, methyl ethyl ketone, and methyl isobutyl ketone; and ether solvents such as diethyl ether, dibutyl ether, cyclopentyl methyl ether, tetrahydrofuran, and 1,4-dioxane, which may be used alone or in admixture.

Of these, aromatic solvents such as toluene and xylene are preferred from the standpoints of solubility and volatility.

The amount of the solvent added is preferably 10 to 20,000 parts by weight, more preferably 100 to 10,000 parts by weight per 100 parts by weight of the polyoxyalkylene-containing organosilicon compound having formula (1).

It is noted that various additives such as adhesion improvers, inorganic and organic UV absorbers, storage stability improvers, plasticizers, fillers, pigments and flavors may be added to the inventive composition depending on a particular application.

A coated solid substrate may be obtained by coating the coating composition of the invention described above on the surface of a solid substrate and curing the composition to form a coating layer. Also, a bonded laminate may be obtained by coating the adhesive composition of the invention on the surface of a solid substrate, laying another solid substrate thereon, and curing the composition to form a bond layer.

The technique of coating each composition is not particularly limited. The coating technique may be selected as appropriate from well-known techniques such as spray coating, spin coating, dip coating, roller coating, brush coating, bar coating, and flow coating.

The solid substrate is not particularly limited. Examples include organic resin substrates such as epoxy resins, phenolic resins, polyimide resins, polycarbonate resins such as polycarbonates and polycarbonate blends, acrylic resins such as poly(methyl methacrylate), polyester resins such as poly(ethylene terephthalate), poly(butylene terephthalate), and unsaturated polyester resins, polyamide resins, acrylonitrile-styrene copolymer resins, styrene-acrylonitrile-butadiene copolymer resins, polyvinyl chloride resins, polystyrene resins, blends of polystyrene and polyphenylene ether, cellulose acetate butyrate, and polyethylene resins; metal substrates such as iron, copper and steel plates; paint-coated surfaces; glass; ceramics; concrete; slates; textiles; inorganic fillers such as wood, stone, tiles, (hollow) silica, titania, zirconia, and alumina; and fiber glass parts such as glass fibers, glass clothes, glass tape, glass mat, and glass paper. The material and shape of the substrate are not particularly limited.

The inventive composition is such that the polyoxyalkylene-containing organosilicon compound having formula (1) undergoes hydrolytic condensation reaction upon contact with airborne moisture. As the index of moisture in the atmosphere, any humidity in the range of RH 10% to 100% is acceptable. Since faster hydrolysis takes place at a higher humidity, moisture may be added to the atmosphere if desired.

The temperature and time of curing reaction may vary over a range depending on various factors such as a particular substrate, moisture concentration, catalyst concentration, and the type of hydrolyzable group. The curing reaction temperature is preferably normal temperature around 25° C. from the standpoint of working. To promote curing reaction, the coating may be cured by heating within the range below which the substrate is heat resistant. The curing reaction time is typically about 1 minute to about 1 week from the standpoint of working efficiency.

The inventive composition cures effectively even at normal temperature. Particularly when room temperature cure is essential for in-situ application or the like, the composition is good in cure and working because the coating surface becomes tack-free within several minutes to several hours. Nevertheless, heat treatment within the range below which the substrate is heat resistant is acceptable.

EXAMPLES

Examples and Comparative Examples are given below for further illustrating the invention although the invention is not limited thereto.

It is noted that the viscosity is measured at 25° C. by a Brookfield rotational viscometer, and the molecular weight and the degree of polymerization (DOP) (i.e., number of repeating polyoxyalkylene units) are a number average molecular weight (Mn) and a number average DOP measured by gel permeation chromatography (GPC) versus polystyrene standards, respectively.

[1] Synthesis of Polyoxyalkylene-Containing Organic Compound

Example 1-1

Synthesis of Polyoxyalkylene Compound 1

A 200-mL separable flask equipped with a stirrer, reflux condenser, and thermometer was charged with 100 g (0.039 mole as terminal allyl functionality) of a both end allyl-containing polypropylene glycol having a Mn of 7,800 and 6.6 g (0.039 mole as mercapto functionality) of mercaptomethyltrimethoxysilane and heated at 90° C. Then, 0.1 g of 2,2'-azobis-2-methylbutyronitrile was added to the contents, which were stirred at 90° C. for 3 hours. On $^1$H-NMR analysis, the time when the peaks assigned to allyl and mercapto groups on the reactants disappeared completely and instead, the peak assigned to the desired polyoxyalkylene compound was detected was regarded the end of reaction.

The reaction product was a pale yellow clear liquid having a Mn of 8,100, a DOP of 130, and a viscosity of 3,300 mPa·s.

Example 1-2

Synthesis of Polyoxyalkylene Compound 2

A 200-mL separable flask equipped with a stirrer, reflux condenser, and thermometer was charged with 100 g (0.039 mole as terminal allyl functionality) of a both end allyl-containing polypropylene glycol having a Mn of 7,800 and 5.9 g (0.039 mole as mercapto functionality) of mercaptomethyldimethoxymethylsilane and heated at 90° C. Then, 0.1 g of 2,2'-azobis-2-methylbutyronitrile was added to the contents, which were stirred at 90° C. for 3 hours. On $^1$H-NMR analysis, the time when the peaks assigned to allyl and mercapto groups on the reactants disappeared completely and instead, the peak assigned to the desired polyoxyalkylene compound was detected was regarded the end of reaction.

The reaction product was a pale yellow clear liquid having a Mn of 8,100, a DOP of 130, and a viscosity of 3,100 mPa·s.

Example 1-3

Synthesis of Polyoxyalkylene Compound 3

A 200-mL separable flask equipped with a stirrer, reflux condenser, and thermometer was charged with 100 g (0.039 mole as terminal allyl functionality) of a both end allyl-containing polypropylene glycol having a Mn of 7,800 and 8.2 g (0.039 mole as mercapto functionality) of mercaptomethyltriethoxysilane and heated at 90° C. Then, 0.1 g of 2,2'-azobis-2-methylbutyronitrile was added to the contents, which were stirred at 90° C. for 3 hours. On $^1$H-NMR analysis, the time when the peaks assigned to allyl and mercapto groups on the reactants disappeared completely and instead, the peak assigned to the desired polyoxyalkylene compound was detected was regarded the end of reaction.

The reaction product was a pale yellow clear liquid having a Mn of 8,200, a DOP of 130, and a viscosity of 2,900 mPa·s.

Example 1-4

Synthesis of Polyoxyalkylene Compound 4

A 200-mL separable flask equipped with a stirrer, reflux condenser, and thermometer was charged with 100 g (0.070 mole as terminal allyl functionality) of a both end allyl-containing polypropylene glycol having a Mn of 5,100 and 11.8 g (0.070 mole as mercapto functionality) of mercaptomethyltrimethoxysilane and heated at 90° C. Then, 0.1 g of 2,2'-azobis-2-methylbutyronitrile was added to the contents, which were stirred at 90° C. for 3 hours. On $^1$H-NMR analysis, the time when the peaks assigned to allyl and mercapto groups on the reactants disappeared completely and instead, the peak assigned to the desired polyoxyalkylene compound was detected was regarded the end of reaction.

The reaction product was a pale yellow clear liquid having a Mn of 5,400, a DOP of 50, and a viscosity of 480 mPa·s.

Example 1-5

Synthesis of Polyoxyalkylene Compound 5

A 200-mL separable flask equipped with a stirrer, reflux condenser, and thermometer was charged with 100 g (0.025 mole as terminal allyl functionality) of a both end allyl-containing polypropylene glycol having a Mn of 15,500 and 4.2 g (0.025 mole as mercapto functionality) of mercaptomethyltrimethoxysilane and heated at 90° C. Then, 0.1 g of 2,2'-azobis-2-methylbutyronitrile was added to the contents, which were stirred at 90° C. for 3 hours. On $^1$H-NMR analysis, the time when the peaks assigned to allyl and mercapto groups on the reactants disappeared completely and instead, the peak assigned to the desired polyoxyalkylene compound was detected was regarded the end of reaction.

The reaction product was a pale yellow clear liquid having a Mn of 15,800, a DOP of 250, and a viscosity of 12,400 mPa·s.

Example 1-6

Synthesis of Polyoxyalkylene Compound 6

A 200-mL separable flask equipped with a stirrer, reflux condenser, and thermometer was charged with 100 g (0.068 mole as terminal allyl functionality) of a both end allyl-containing polypropylene glycol/polyethylene glycol copolymer (molar ratio of polypropylene glycol structural units/polyethylene glycol structural units: 25/75) having a Mn of 5,200 and 11.4 g (0.068 mole as mercapto functionality) of mercaptomethyltrimethoxysilane and heated at 90° C. Then, 0.1 g of 2,2'-azobis-2-methylbutyronitrile was added to the contents, which were stirred at 90° C. for 3 hours. On $^1$H-NMR analysis, the time when the peaks assigned to allyl and mercapto groups on the reactants disappeared completely and instead, the peak assigned to the desired polyoxyalkylene compound was detected was regarded the end of reaction.

The reaction product was a pale yellow clear liquid having a Mn of 5,600, a DOP of 65, and a viscosity of 660 mPa·s.

Comparative Example 1-1

Synthesis of Polyoxyalkylene Compound 7

A 200-mL separable flask equipped with a stirrer, reflux condenser, and thermometer was charged with 100 g (0.040 mole as terminal hydroxyl functionality) of a both end hydroxyl-containing polypropylene glycol having a Mn of 7,600 and 7.1 g (0.040 mole of isocyanate functionality) of isocyanatomethyltrimethoxysilane and heated at 80° C. Then, 0.1 g of dioctyltin dilaurate was added to the contents, which were stirred at 80° C. for 3 hours. On IR analysis, the time when the absorption peak assigned to an isocyanate group on the reactant disappeared completely and instead, the absorption peak assigned to a urethane bond was detected was regarded the end of reaction.

The reaction product was a pale yellow clear liquid having a Mn of 8,000, a DOP of 130, and a viscosity of 3,700 mPa·s.

Comparative Example 1-2

Synthesis of Polyoxyalkylene Compound 8

A 200-mL separable flask equipped with a stirrer, reflux condenser, and thermometer was charged with 100 g (0.040 mole as terminal hydroxyl functionality) of a both end hydroxyl-containing polypropylene glycol having a Mn of 7,600 and 6.1 g (0.040 mole) of tetramethoxysilane, which were stirred at 80° C. for 3 hours. On IR analysis, the time when the absorption peak assigned to hydroxyl groups on the reactant disappeared completely was regarded the end of reaction.

The reaction product was a colorless clear liquid having a Mn of 22,000 and a viscosity of 6,800 mPa·s.

Comparative Example 1-3

Synthesis of Polyoxyalkylene Compound 9

A 200-mL separable flask equipped with a stirrer, reflux condenser, and thermometer was charged with 100 g (0.039 mole as terminal allyl functionality) of a both end allyl-containing polypropylene glycol having a Mn of 7,800 and 7.7 g (0.039 mole as mercapto functionality) of 3-mercaptopropyltrimethoxysilane and heated at 90° C. Then, 0.1 g of 2,2'-azobis-2-methylbutyronitrile was added to the contents, which were stirred at 90° C. for 3 hours. On $^1$H-NMR analysis, the time when the peaks assigned to allyl and mercapto groups on the reactants disappeared completely and instead, the peak assigned to the desired polyoxyalkylene compound was detected was regarded the end of reaction.

The reaction product was a pale yellow clear liquid having a Mn of 8,100, a DOP of 130, and a viscosity of 3,300 mPa·s.

Comparative Example 1-4

Synthesis of Polyoxyalkylene Compound 10

A 200-mL separable flask equipped with a stirrer, reflux condenser, and thermometer was charged with 100 g (0.039 mole as terminal allyl functionality) of a both end allyl-containing polypropylene glycol having a Mn of 7,800, 4.8 g (0.039 mole as Si—H functionality) of trimethoxysilane and 0.15 g ($1.0 \times 10^{-4}$ mole of platinum atoms per mole of trimethoxysilane) of toluene solution of platinum-1,3-divinyl-1,1,3,3-tetramethyldisiloxane complex. The contents were stirred at 80° C. for 3 hours. On IR analysis, the time when the absorption peak assigned to Si—H groups on the reactant disappeared completely was regarded the end of reaction.

The reaction product was a colorless clear liquid having a Mn of 11,300 and a viscosity of 7,500 mPa·s.

[2] Preparation of Composition and Cured Coating

Example 2-1

A composition was prepared by mixing 100 parts by weight of polyoxyalkylene compound 1 in Example 1-1 and 0.5 part by weight of tetramethylguanidylpropyltrimethoxysilane as the curing catalyst on a mixer under moisture-barrier conditions until uniform.

The composition was coated onto a glass plate in air at 25° C. and 50% RH by means of a bar coater No. 14, and dried and cured in air at 25° C. and 50% RH for 1 day, yielding a cured coating.

Examples 2-2 to 2-6 and Comparative Examples 2-1 to 2-4

Compositions and cured coatings were prepared as in Example 2-1 aside from using polyoxyalkylene compounds 2 to 6 in Examples 1-2 to 1-6 or polyoxyalkylene compounds 7 to 10 in Comparative Examples 1-1 to 1-4 instead of polyoxyalkylene compound 1 in Example 2-1.

Example 2-7

A composition and cured coating were prepared as in Example 2-1 aside from using 5 parts by weight of 3-aminopropyltrimethoxysilane as the curing catalyst instead of 0.5 part by weight of tetramethylguanidylpropyltrimethoxysilane.

Example 2-8

A composition and cured coating were prepared as in Example 2-1 aside from using 5 parts by weight of dioctyltin diversatate as the curing catalyst instead of 0.5 part by weight of tetramethylguanidylpropyltrimethoxysilane.

Example 2-9

A composition and cured coating were prepared as in Example 2-1 aside from using 2 parts by weight of titanium diisopropoxybis(ethylacetoacetate) as the curing catalyst instead of 0.5 part by weight of tetramethylguanidylpropyltrimethoxysilane.

Comparative Example 2-5

A composition and cured coating were prepared as in Comparative Example 2-3 aside from using 5 parts by weight of 3-aminopropyltrimethoxysilane as the curing catalyst instead of 0.5 part by weight of tetramethylguanidylpropyltrimethoxysilane.

Comparative Example 2-6

A composition and cured coating were prepared as in Comparative Example 2-3 aside from using 5 parts by weight of dioctyltin diversatate as the curing catalyst instead of 0.5 part by weight of tetramethylguanidylpropyltrimethoxysilane.

Comparative Example 2-7

A composition and cured coating were prepared as in Comparative Example 2-4 aside from using 5 parts by weight of 3-aminopropyltrimethoxysilane as the curing catalyst instead of 0.5 part by weight of tetramethylguanidylpropyltrimethoxysilane.

Comparative Example 2-8

A composition and cured coating were prepared as in Comparative Example 2-4 aside from using 5 parts by weight of dioctyltin diversatate as the curing catalyst instead of 0.5 part by weight of tetramethylguanidylpropyltrimethoxysilane.

The cured coatings in Examples 2-1 to 2-9 and Comparative Examples 2-1 to 2-8 were evaluated by the following tests. The results are shown in Tables 1 and 2.

[Tack-Free Time]

A specimen obtained by coating the composition onto a glass plate by the above coating technique was allowed to stand in air at 25° C. and 50% RH, during which moisture cure took place. The time taken until the coating became tack-free when the finger was pressed onto the coating surface was reported, with a smaller value indicating better cure.

[Yellowing Resistance]

A specimen having a cured coating formed on a glass plate by the above coating technique was exposed in air at 25° C. and 50% RH for 2 weeks to UV from a sterilizing lamp (accumulative dose 26,000 mJ/cm$^2$). The degree of yellowing of the cured coating before and after the exposure was evaluated according to JIS K7373 using a colorimeter, and reported as ΔYI (a change of yellowness index YI), with a smaller value indicating better yellowing resistance.

The specimen was rated yellowing resistant (O) when ΔYI was less than 0.5, or poor (X) when ΔYI was 0.5 or more.

TABLE 1

| | Example | | | | | | | | |
|---|---|---|---|---|---|---|---|---|---|
| | 2-1 | 2-2 | 2-3 | 2-4 | 2-5 | 2-6 | 2-7 | 2-8 | 2-9 |
| Polyoxyalkylene compound | 1 | 2 | 3 | 4 | 5 | 6 | 1 | 1 | 1 |
| Tack-free time | 1 hr | 2 hr | 2 hr | 30 min | 3 hr | 30 min | 12 hr | 1 hr | 30 min |
| Yellowing resistance ΔYI | 0.2 | 0.2 | 0.2 | 0.3 | 0.1 | 0.2 | 0.4 | 0.1 | 0.3 |
| Yellowing resistance Rating | O | O | O | O | O | O | O | O | O |

TABLE 2

| | Comparative Example | | | | | | | |
|---|---|---|---|---|---|---|---|---|
| | 2-1 | 2-2 | 2-3 | 2-4 | 2-5 | 2-6 | 2-7 | 2-8 |
| Polyoxyalkylene compound | 7 | 8 | 9 | 10 | 9 | 9 | 10 | 10 |
| Tack-free time | 2 hr | 24 hr | 1 week | uncured | uncured | 24 hr | uncured | 24 hr |
| Yellowing resistance ΔYI | 4.4 | 0.2 | 2.6 | — | — | 1.6 | — | 0.4 |
| Yellowing resistance Rating | X | O | X | — | — | X | — | O |

As seen from Tables 1 and 2, the cured coatings of Examples 2-1 to 2-9 using polyoxyalkylene compounds 1 to 6 in Examples 1-1 to 1-6 are improved in curability and yellowing resistance over the cured coatings of Comparative Examples 2-1 to 2-8, satisfying these physical properties at the same time.

On the other hand, the cured coatings of Comparative Examples 2-1 to 2-8 fail to meet curability and yellowing resistance at the same time. In Comparative Examples 2-4, 2-5 and 2-7, the coatings under-cured or did not cure at all.

As discussed above, using the polyoxyalkylene-containing organosilicon compounds within the scope of the invention, cured coatings having improved curability and yellowing resistance are obtained. These compositions can satisfy curability and yellowing resistance at the same time, which are difficult to achieve with the prior art compositions.

Also the compositions are less toxic because of the elimination of isocyanatosilanes. Even when amine compounds are used as the curing catalyst in order to formulate compositions free of organotin compounds which are toxic, the resulting compositions are effectively curable.

The invention claimed is:

1. A curable composition comprising (A) a polyoxyalkylene-containing organosilicon compound having a polyoxyalkylene structure in the backbone and containing per molecule at least one group having the structural formula (1) and (B) a curing catalyst, wherein the curing catalyst (B) is an amine compound:

[Chem. 1]

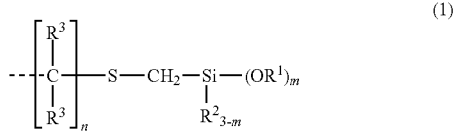

wherein $R^1$ is each independently a substituted or unsubstituted $C_1$-$C_{10}$ alkyl group or a substituted or unsubstituted $C_6$-$C_{10}$ aryl group, $R^2$ is each independently a substituted or unsubstituted $C_1$-$C_{10}$ alkyl group or a substituted or unsubstituted $C_6$-$C_{10}$ aryl group, $R^3$ is each independently hydrogen or a substituted or unsubstituted $C_1$-$C_{10}$ alkyl group, m is a number of 1 to 3, n is an integer of at least 2, and the broken line represents a valence bond.

2. The curable composition of claim 1, wherein the polyoxyalkylene-containing organosilicon compound has the structural formula (2):

[Chem. 2]

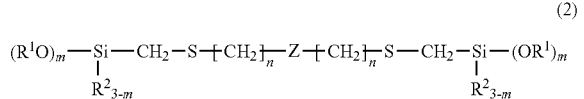

wherein $R^1$, $R^2$, m and n are as defined above, and Z is a polyoxyalkylene structure having the formula (3):

[Chem. 3]

wherein $R^4$ is a $C_1$-$C_{14}$ divalent hydrocarbon group, p is a number of at least 1, and the broken line represents a valence bond.

3. The curable composition of claim 1 wherein the polyoxyalkylene-containing organosilicon compound has a number average molecular weight of 200 to 50,000.

4. The curable composition of claim 1 wherein the amine compound is at least one selected from the group consisting of aminoalkyl-substituted alkoxysilanes quaternary ammonium salts, dialkylhydroxylamines, silanes and siloxanes having a guanidyl group and phosphazene base-containing silanes and siloxanes.

5. The curable composition of claim 4 wherein the amine compound is at least one selected from the group consisting of 3-aminopropyltrimethoxysilane, 3-aminopropyltriethoxysilane, 3-aminopropylmethyldimethoxysilane, 3-aminopropylmethyldiethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine, N-phenyl-3-aminopropyltrimethoxysilane, benzyltriethylammonium acetate, dimethylhydroxylamine, diethylhydroxylamine, tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, tetramethylguanidylpropyltris(trimethylsiloxy)silane, and N,N,N',N',N'',N''-hexamethyl-N'''-[3-(trimethoxysilyl)propyl]-phosphorimidic triamide.

6. A cured product obtained from curing of the curable composition of claim 1.

7. A coating composition comprising (A) a polyoxyalkylene-containing organosilicon compound having a polyoxyalkylene structure in the backbone and containing per molecule at least one group having the structural formula (1) and (B) a curing catalyst, wherein the curing catalyst (B) is an amine compound:

[Chem. 4]

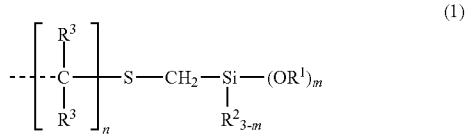

wherein $R^1$ is each independently a substituted or unsubstituted $C_1$-$C_{10}$ alkyl group or a substituted or unsubstituted $C_6$-$C_{10}$ aryl group, $R^2$ is each independently a substituted or unsubstituted $C_1$-$C_{10}$ alkyl group or a substituted or unsubstituted $C_6$-$C_{10}$ aryl group, $R^3$ is each independently hydrogen or a substituted or unsubstituted $C_1$-$C_{10}$ alkyl group, m is a number of 1 to 3, n is an integer of at least 2, and the broken line represents a valence bond.

8. The coating composition of claim 7 wherein the polyoxyalkylene-containing organosilicon compound has the structural formula (2):

[Chem. 5]

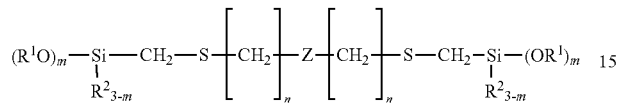

(2)

wherein $R^1$, $R^2$, m and n are as defined above, and Z is a polyoxyalkylene structure having the formula (3):

[Chem. 6]

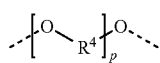

(3)

wherein $R^4$ is a $C_1$-$C_{14}$ divalent hydrocarbon group, p is a number of at least 1, and the broken line represents a valence bond.

9. An article having a coating layer obtained from curing of the coating composition of claim 7.

10. An adhesive composition comprising (A) a polyoxyalkylene-containing organosilicon compound having a polyoxyalkylene structure in the backbone and containing per molecule at least one group having the structural formula (1) and (B) a curing catalyst, wherein the curing catalyst (B) is an amine compound:

[Chem. 7]

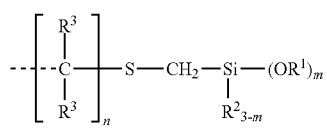

(1)

wherein $R^1$ is each independently a substituted or unsubstituted $C_1$-$C_{10}$ alkyl group or a substituted or unsubstituted $C_6$-$C_{10}$ aryl group, $R^2$ is each independently a substituted or unsubstituted $C_1$-$C_{10}$ alkyl group or a substituted or unsubstituted $C_6$-$C_{10}$ aryl group, $R^3$ is each independently hydrogen or a substituted or unsubstituted $C_1$-$C_{10}$ alkyl group, m is a number of 1 to 3, n is an integer of at least 2, and the broken line represents a valence bond.

11. The adhesive composition of claim 10 wherein the polyoxyalkylene-containing organosilicon compound has the structural formula (2):

[Chem. 8]

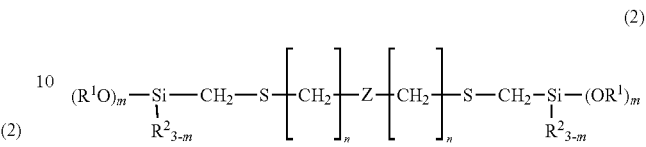

(2)

wherein $R^1$, $R^2$, m and n are as defined above, and Z is a polyoxyalkylene structure having the formula (3):

[Chem. 9]

(3)

wherein $R^4$ is a $C_1$-$C_{14}$ divalent hydrocarbon group, p is a number of at least 1, and the broken line represents a valence bond.

12. An article having a bond layer obtained from curing of the adhesive composition of claim 10.

13. The coating composition of claim 7 wherein the amine compound is at least one selected from the group consisting of aminoalkyl-substituted alkoxysilanes quaternary ammonium salts, dialkylhydroxylamines, silanes and siloxanes having a guanidyl group and phosphazene base-containing silanes and siloxanes.

14. The coating composition of claim 13 wherein the amine compound is at least one selected from the group consisting of 3-aminopropyltrimethoxysilane, 3-aminopropyltriethoxysilane, 3-aminopropylmethyldimethoxysilane, 3-aminopropylmethyldiethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine, N-phenyl-3-aminopropyltrimethoxysilane, benzyltriethylammonium acetate, dimethylhydroxylamine, diethylhydroxylamine, tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, tetramethylguanidylpropyltris(trimethylsiloxy)silane; and N,N,N',N',N'',N''-hexamethyl-N'''-[3-(trimethoxysilyl)propyl]-phosphorimidic triamide.

15. The adhesive composition of claim 7 wherein the amine compound is at least one selected from the group consisting of aminoalkyl-substituted alkoxysilanes quaternary ammonium salts, dialkylhydroxylamines, silanes and siloxanes having a guanidyl group and phosphazene base-containing silanes and siloxanes.

16. The adhesive composition of claim 13 wherein the amine compound is at least one selected from the group consisting of 3-aminopropyltrimethoxysilane, 3-aminopropyltriethoxysilane, 3-aminopropylmethyldimethoxysilane, 3-aminopropylmethyldiethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine, N-phenyl-3-aminopropyltrimethoxysilane, benzyltriethylammonium acetate, dimethylhydroxylamine, diethylhydroxylamine, tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, tetramethylguanidylpropyltris(trimethylsiloxy)silane; and N,N,N',N',N",N"-hexamethyl-N'"-[3-(trimethoxysilyl)propyl]-phosphorimidic triamide.

* * * * *